United States Patent
Huang

(10) Patent No.: US 7,237,540 B2
(45) Date of Patent: Jul. 3, 2007

(54) METHOD OF MODIFYING EXHAUST VALVE TIMING TO IMPROVE ENGINE PERFORMANCE

(75) Inventor: Shenquiang Huang, West Simsbury, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 11/159,275

(22) Filed: Jun. 23, 2005

(65) Prior Publication Data
US 2006/0000457 A1 Jan. 5, 2006

Related U.S. Application Data

(63) Continuation of application No. PCT/US03/40816, filed on Dec. 22, 2003.

(60) Provisional application No. 60/435,296, filed on Dec. 23, 2002.

(51) Int. Cl.
- *E02M 25/07* (2006.01)
- *F02B 47/08* (2006.01)
- *F01N 3/18* (2006.01)
- *F01L 1/34* (2006.01)

(52) U.S. Cl. ............ 123/568.14; 123/316; 123/90.15; 60/285

(58) Field of Classification Search ............ 123/90.11, 123/90.15–90.18, 311, 315, 316, 430, 568.14, 123/568.21, 321, 322, 559.1, 295, 305, 676; 60/606, 274, 285
See application file for complete search history.

(56) References Cited

U.S. PATENT DOCUMENTS

| | | | | |
|---|---|---|---|---|
| 4,324,210 A | * | 4/1982 | Aoyama | 123/90.16 |
| 5,161,497 A | * | 11/1992 | Simko et al. | 123/90.15 |
| 5,590,626 A | * | 1/1997 | Hitomi et al. | 123/90.15 |
| 5,713,330 A | * | 2/1998 | Hitomi et al. | 123/559.1 |
| 5,862,790 A | * | 1/1999 | Dai et al. | 123/316 |
| 5,878,714 A | * | 3/1999 | Dai et al. | 123/316 |
| 6,085,705 A | | 7/2000 | Vorih | |
| 6,293,237 B1 | | 9/2001 | Vorih | |
| 6,405,694 B2 | | 6/2002 | Sato | |
| 6,474,277 B1 | | 11/2002 | Vanderpoel et al. | |
| 6,497,213 B2 | * | 12/2002 | Yoshizawa et al. | 123/430 |

(Continued)

FOREIGN PATENT DOCUMENTS

| | | | | |
|---|---|---|---|---|
| EP | 0 761 950 A | | 3/1997 | |
| EP | 1 195 505 A | | 4/2002 | |
| EP | 1 241 345 A | | 9/2002 | |
| JP | 2002227667 A | * | 8/2002 | 123/90.16 |
| JP | 2002303164 A | * | 10/2002 | 123/90.16 |

*Primary Examiner*—Willis R. Wolfe, Jr.
(74) *Attorney, Agent, or Firm*—David R. Yohannan; Kelley Drye & Warren LLP

(57) ABSTRACT

A method for actuating one or more exhaust valves in an internal combustion engine during positive power operation is disclosed. The expansion stroke of an engine cylinder is effectively lengthened and the exhaust stroke is effectively shortened by delaying the opening and/or advancing the closing of the exhaust valve relative to conventional exhaust valve timing during the exhaust stroke. Selective variation of the exhaust stroke during positive power operation of the engine may reduce NOx production.

14 Claims, 6 Drawing Sheets

U.S. PATENT DOCUMENTS

| | | |
|---|---|---|
| 6,510,824 B2 | 1/2003 | Vorih et al. |
| 6,550,433 B2 | 4/2003 | Vorih et al. |
| 6,644,019 B2 * | 11/2003 | Morikawa et al. ............ 60/285 |
| 6,647,954 B2 | 11/2003 | Yang et al. |
| 6,655,349 B1 | 12/2003 | Cavanagh |
| 6,807,956 B2 * | 10/2004 | Gaessler et al. ....... 123/568.14 |
| 2001/0015193 A1 * | 8/2001 | Tanaka et al. ......... 123/568.21 |
| 2003/0221663 A1 | 12/2003 | Vanderpoel et al. |

* cited by examiner

METHOD OF MODIFYING EXHAUST VALVE TIMING TO IMPROVE ENGINE PERFORMANCE

CROSS REFERENCE TO RELATED APPLICATIONS

This application is a continuation of International Application No. PCT/US03/40816, filed Dec. 22, 2003, entitled "Method of Modifying Exhaust Valve Timing to Improve Engine Performance", which claims priority under 35 U.S.C. 119(e) on U.S. Provisional Application No. 60/435,296, filed Dec. 23, 2002, and entitled "Method of Modifying Exhaust Valve Timing to Improve Engine Performance". The entire contents of these applications are hereby incorporated by reference.

FIELD OF THE INVENTION

The present invention relates to methods of varying the opening and closing times of engine valves in internal combustion engines.

BACKGROUND OF THE INVENTION

Modern day internal combustion engine manufacturers, particularly diesel engine manufacturers, are concerned with meeting current and future emissions standards without negatively impacting engine power or fuel consumption. Thus, there is great interest in developing methods and systems that may be used to reduce various types of engine emissions, including, but not limited to nitrous oxides (NOx). It may be particularly desirable to improve NOx performance without negatively impacting brake specific fuel consumption (BSFC).

Control over the capture or "after-treatment" of unwanted emission gases, such as NOx, may be a function of the exhaust temperature. Modern diesel engines are provided with emission control devices designed to reduce these unwanted components of the exhaust. These emission control devices are designed to operate most efficiently in a specified range of temperatures, typically in the range of 250 to 450 degrees Celsius. If the exhaust temperature is too far above or below this range, the emission control device may be less efficient, and as a result, allow more unwanted emissions to pass through the exhaust system to the atmosphere. Accordingly, it is desirable to maintain the exhaust gas temperature within the specified range throughout various engine operating conditions.

It is common, however, for engine exhaust temperature to vary in accordance with varying engine operating conditions. For example, exhaust temperature usually varies proportionally with engine load—the higher the engine load, the higher the exhaust temperature. Accordingly, it is typically at low engine load that the exhaust temperature may fall below the range that is desired for operation of the emission control device that limits unwanted emissions. Thus, there is a need to maintain the exhaust temperature in the desired range for operation of the emission control device across as broad a range of engine load conditions as possible.

The NOx component of diesel engine exhaust may be produced as a result of excess oxygen in the combustion mixture and/or high combustion temperatures. The combustion mixture is largely made up of air, and thus contains a large amount of nitrogen. At higher combustion temperatures, the nitrogen may combine with any free oxygen that remains after combustion to produce NOx. The production of NOx may be reduced by limiting the combustion temperature, and/or limiting the amount of excess oxygen in the engine cylinder during the combustion cycle. In fact, limiting the amount of oxygen in the cylinder may also help to reduce the combustion temperature because the reduction of oxygen tends to produce less complete combustion, which in turn may reduce combustion temperatures. Thus, there is a need to limit combustion temperatures and/or the amount of excess oxygen in the combustion chamber during the combustion cycle.

Control over the exhaust gas temperature in the cylinder and the exhaust system, as well as the amount of oxygen in the combustion mixture, may be exercised through control of the intake and exhaust engine valve timing. Some internal combustion engines are to be equipped with variable valve actuation (VVA) systems designed to provide control over the timing of intake and exhaust engine valve operation. Examples of such VVA systems are provided in Vorih et al., U.S. Pat. No. 6,510,824 (Jan. 28, 2003), entitled "Variable Lost Motion Valve Actuation and Method;" and Vanderpoel et al., U.S. Pat. Appl. Pub. No. U.S. 2003/0221663 A1 (Dec. 4, 2003) entitled "Compact Lost Motion System for Variable Valve Actuation," both of which are incorporated herein by reference. When appropriately designed and controlled, VVA systems may enable the opening and/or closing times of an engine valve to be adjusted during operation of an engine. This adjustment may be used to control various engine performance characteristics, such as cylinder temperature, exhaust system temperature, and oxygen content of the combustion mixture.

Exhaust gas recirculation (EGR) has been proposed as one method of controlling the cylinder and exhaust system temperature, as well as the oxygen content of the cylinder. Specifically, EGR has been proposed as a means of enabling diesel engine manufacturers to lower NOx emissions and meet new emission standards. Broadly speaking, using VVA to carry out internal exhaust gas recirculation requires opening an exhaust valve during an intake stroke or opening an intake valve during an exhaust stroke to facilitate the flow of exhaust gas back into the engine cylinder (or intake manifold) for future combustion cycles. The retention or flow of exhaust gas back into the cylinder for a subsequent combustion cycle may reduce the relative proportion of oxygen in the cylinder that is available for combustion. In turn, this may reduce the amount of oxygen that is available to combine with nitrogen and produce NO. Additionally, the recirculation of the exhaust gases has the effect of increasing the heat capacity of the burned gases for a given quantity of heat release, thus lowering the combustion temperature which also tends to reduce the production of NOx.

EGR may not be ideal for all engine operating conditions, however. An engine operating at a full load and at a low engine speed (such as around the peak torque operating point) is the most difficult mode for introducing EGR without losing engine power or creating a black smoke problem. Thus, there remains a need for alternative solutions.

Accordingly, it is a goal, but not a requirement, of one or more embodiments of the present invention to improve certain engine performance characteristics, including reduction of NOx, production of a tighter exhaust temperature profile across varying operating conditions (including full load), and/or improved brake specific fuel consumption across varying operating conditions (including full load). Additional advantages of various embodiments of the invention may be ascertained, in part, from the description that follows and, in part, will be apparent to one of ordinary skill in the art from the description and/or from the practice of the embodiments of the invention.

SUMMARY OF THE INVENTION

Responsive to the foregoing challenges, Applicant has developed an innovative method in an internal combustion engine having at least one cylinder containing a reciprocating piston and at least one exhaust valve, a method of selectively actuating the exhaust valve during positive power operation of the engine comprising the steps of: determining an engine operating condition during which reduction in NOx is desired; selectively varying the opening time of the exhaust valve for a main exhaust event to begin at about 150 or more crank angle degrees past top center position for the piston responsive to the determination of a desire to reduce NOx; and selectively varying the closing time of the exhaust valve for the main exhaust event to occur no later than about 10 crank angle degrees after top dead center position for the piston.

Applicant has further developed an innovative method in an internal combustion engine having at least one cylinder containing a reciprocating piston and at least one exhaust valve, a method of reducing the production of NOx, comprising the steps of: opening the exhaust valve for a main exhaust event at about 150 or more crank angle degrees past top center position for the piston; and closing the exhaust valve for the main exhaust event at or prior to about 10 crank angle degrees after top dead center position for the piston.

Applicant has still further developed an innovative method in an internal combustion engine having at least one cylinder containing a reciprocating piston and at least one exhaust valve, a method of selectively actuating the exhaust valve during positive power operation of the engine comprising the steps of: determining an engine operating condition during which reduction in NOx is desired; and selectively varying the closing time of the exhaust valve for the main exhaust event to occur at or prior to about 10 crank angle degrees after top dead center position for the piston.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements.

DETAILED DESCRIPTION OF THE EMBODIMENTS OF THE INVENTION

Figure 1:
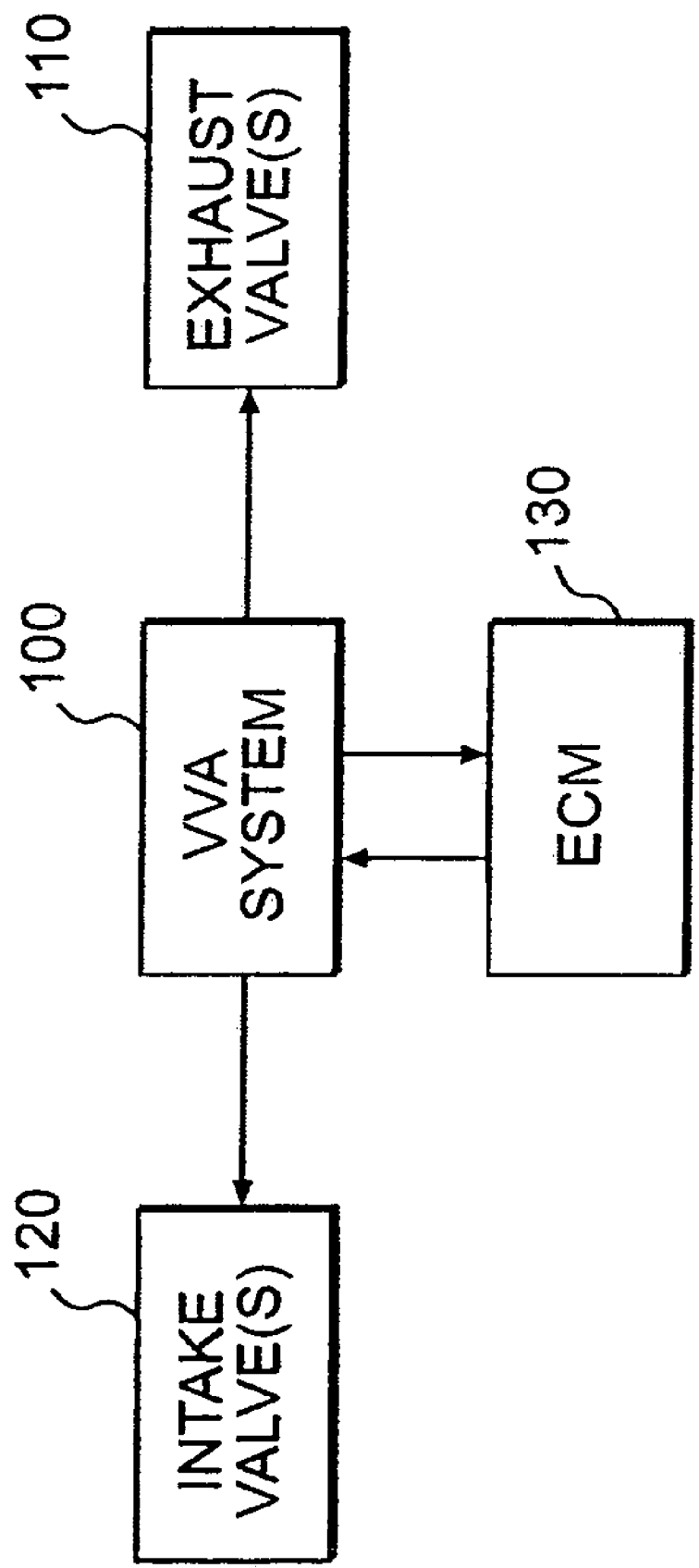
FIG. 1 is a schematic diagram of the components that may be used in accordance with one embodiment to carry out the present invention.

Reference will now be made in detail to a first embodiment of the present invention, an example of which is illustrated in the accompanying drawings. FIG. 1 shows the components that may be used to achieve variable valve actuation in an internal combustion engine. The VVA system 100 may be operatively connected to one or more exhaust valves 110 and one or more intake valves 120. The VVA system 100 may be controlled by an engine control module 130. The VVA system 100 may enable the timing of the exhaust valve(s) 110 to be varied during engine operation. In a first embodiment of the present invention, the valve timing of the exhaust valve(s) 110 may be varied, and accordingly, interoperability between the intake valves 120 and the VVA system 100 may not be required.

A non-exhaustive list of examples of variable valve actuation systems that may be used to carry out the invention are described in Vorih, U.S. Pat. No. 6,085,705; Vorih, U.S. Pat. No. 6,293,237; Vorih et al., U.S. Pat. No. 6,510,824; Cavanagh, U.S. Pat. No. 6,655,349; Yang et al., U.S. Pat. No. 6,647,723; Vorih et al., U.S. Pat. No. 6,550,433; and Vanderpoel, et al., U.S. Pat. No. 6,474,277, each of which are hereby incorporated by reference in their entirety.

Figure 2:
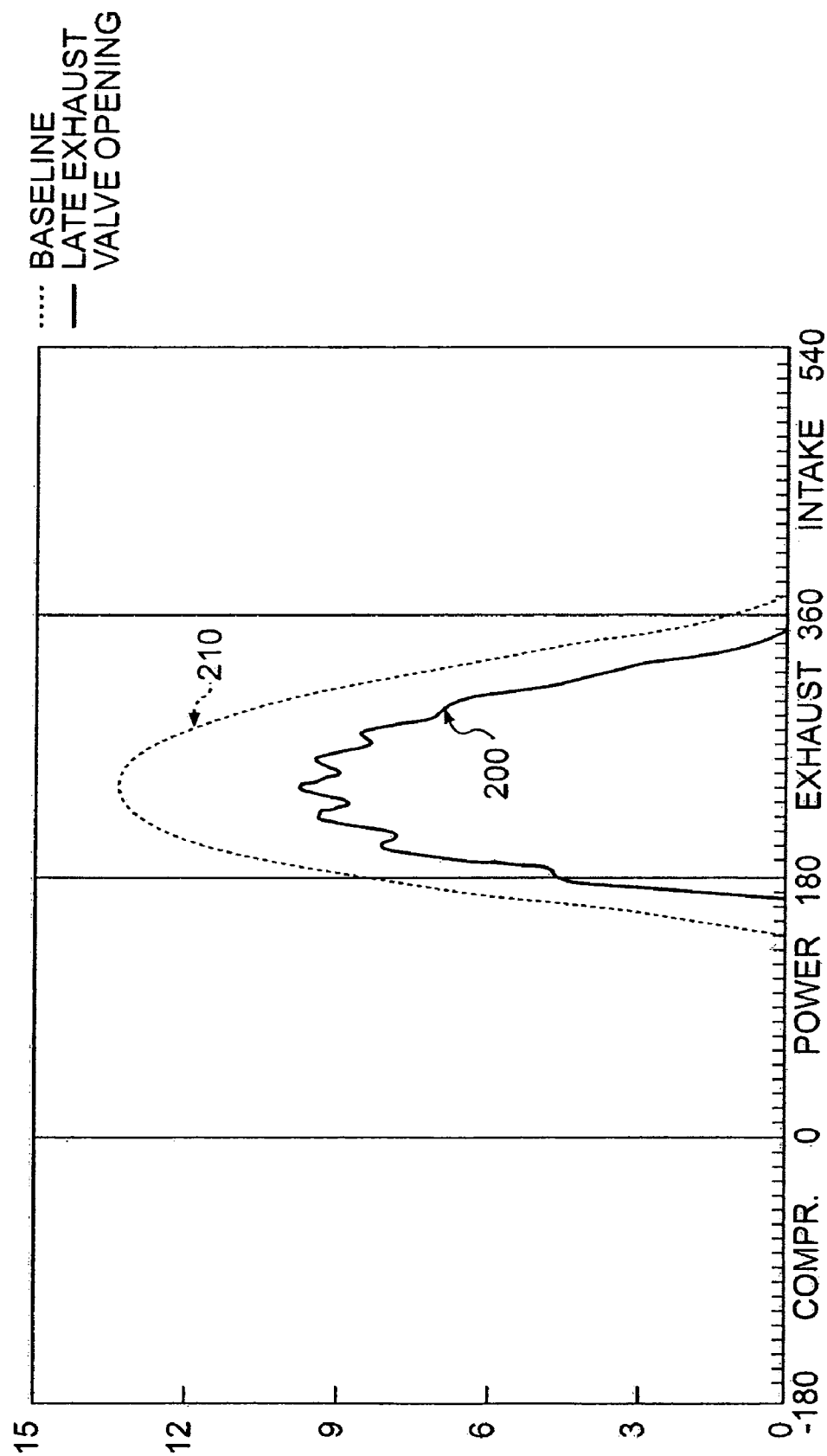
FIG. 2 is a graph comparing exhaust valve timing in accordance with an embodiment of the present invention with conventional exhaust valve timing during positive power operation.

With reference to FIG. 2, the timing and lift of the exhaust valves during positive power operation of the engine is shown in accordance with a first embodiment of the present invention as plot 200. Conventional baseline exhaust valve timing is shown as plot 210 for comparison. Effectively, the first embodiment of the present invention involves a lengthening of the expansion or power stroke and a shorting of the exhaust stroke of a piston in the engine cylinder. One way to achieve this engine cycle may be to open the exhaust valve(s) 110 late and to close the exhaust valve(s) 110 earlier using a VVA system 100. Lengthening the engine power stroke may increase engine power, while shortening the exhaust stroke may trap more exhaust gas in the engine cylinder, thereby reducing the formation of NOx.

With renewed reference to FIG. 2, conventional exhaust valve timing during positive power may cause the exhaust valves 110 to open at about 40 crank angle degrees before bottom dead center, indicated by baseline plot 210 in FIG. 2. The exhaust valve timing provided by the first embodiment of the present invention is indicated by reference numeral 200 in the same figure. In accordance with the first embodiment of the present invention, the opening of the exhaust valve(s) 110 by the VVA system 100, may be delayed by about 10 or more crank angle degrees, and more preferably by approximately 20 crank angle degrees. The closing of the exhaust valve may be advanced by about 10 or more crank angle degrees, and more preferably by approximately 20 crank angle degrees in comparison to conventional exhaust valve timing. Alternatively, the opening of the exhaust valve(s) 110 by the VVA system 100 may be described as occurring at about 150 or more crank angle degrees, and more preferably at about 160 to 165 crank angle degrees, past top dead center position for the piston associated with the exhaust valve(s) 110. The closing of the exhaust valve(s) 110 by the VVA system 100 may be described alternatively as occurring no later than about 10 crank angle degrees past TDC, more preferably no later than at about top dead center position, and in some embodiments at about 10 or less crank angle degrees before top dead center position for the same piston.

Figure 3:
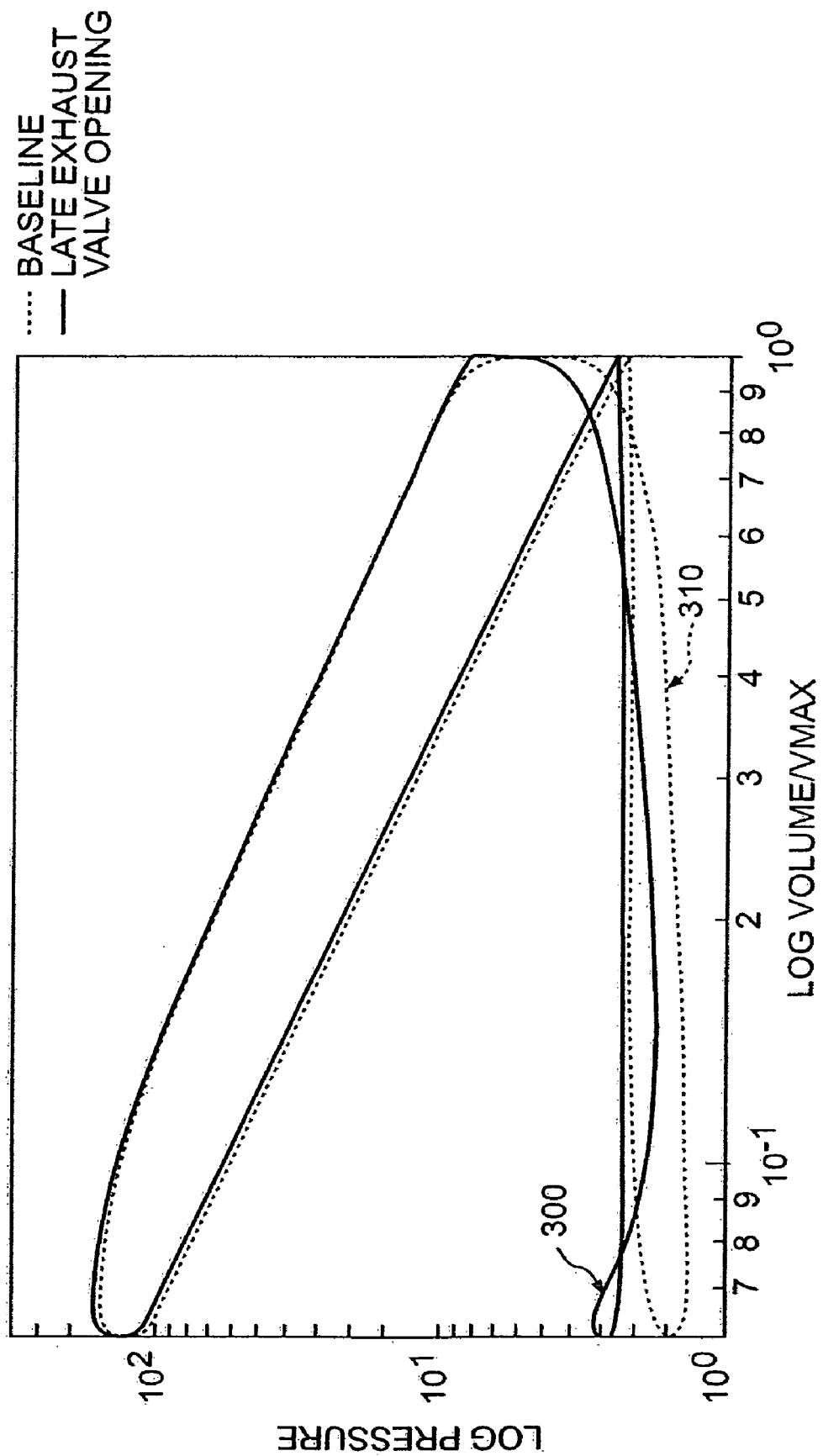
FIG. 3 is a graph comparing the pressure/volume curves produced by the embodiment of the present invention shown in FIG. 2 with the pressure/volume curves produced by the baseline exhaust valve timing shown in FIG. 2.

With respect to FIG. 3, a Pressure-Volume (P-V) plot 300 is shown of the simulated elongated power stroke and shortened exhaust stroke provided by the exhaust valve timing of the first embodiment of the present invention. The P-V plot 300 is compared with a P-V plot 310 of the simulated conventional exhaust valve timing. The P-V plot 300 shows that more expansion work may be achieved when the exhaust valves are opened late. The plot also shows that there may be less pumping losses when the exhaust valves are closed early, which may cause more exhaust gas to be trapped inside the cylinder and lower peak combustion temperature for the next engine cycle.

Figure 4:
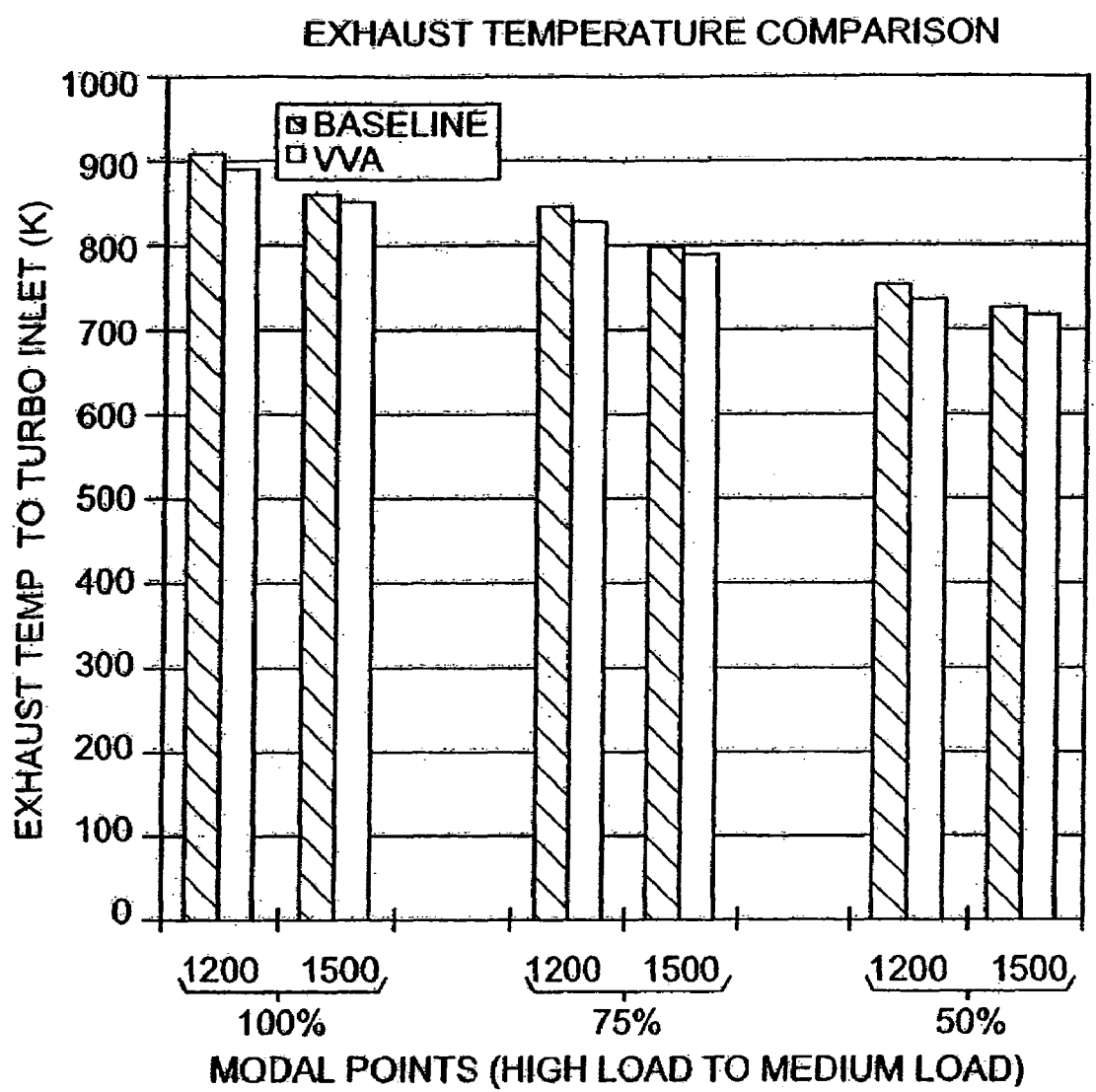
FIG. 4 is a graph comparing the exhaust temperatures produced by the embodiment of the present invention shown in FIG. 2 under different engine operating conditions with the exhaust temperatures produced by the baseline exhaust valve timing shown in FIG. 2.

With respect to FIG. 4, a comparison of the simulated exhaust temperature provided by the first embodiment of the invention (denoted as "VVA") is made with the simulated exhaust temperature provided by conventional exhaust valve timing (denoted as "Baseline"). The exhaust temperatures are simulated for three different engine operating conditions, ranging from high load (100%) to medium load (50%). Exhaust temperatures for two different engine speeds (1200 and 1500 RPM) are shown for each load condition. FIG. 4 shows that at high and medium load conditions (i.e., 100% and 50%) the exhaust temperature may be only slightly reduced by the first embodiment of the invention at 1200 and 1500 RPM in comparison to the Baseline condition. Thus, the first embodiment of the invention may keep the range of exhaust temperatures across various engine operating conditions relatively tight.

Figure 5:
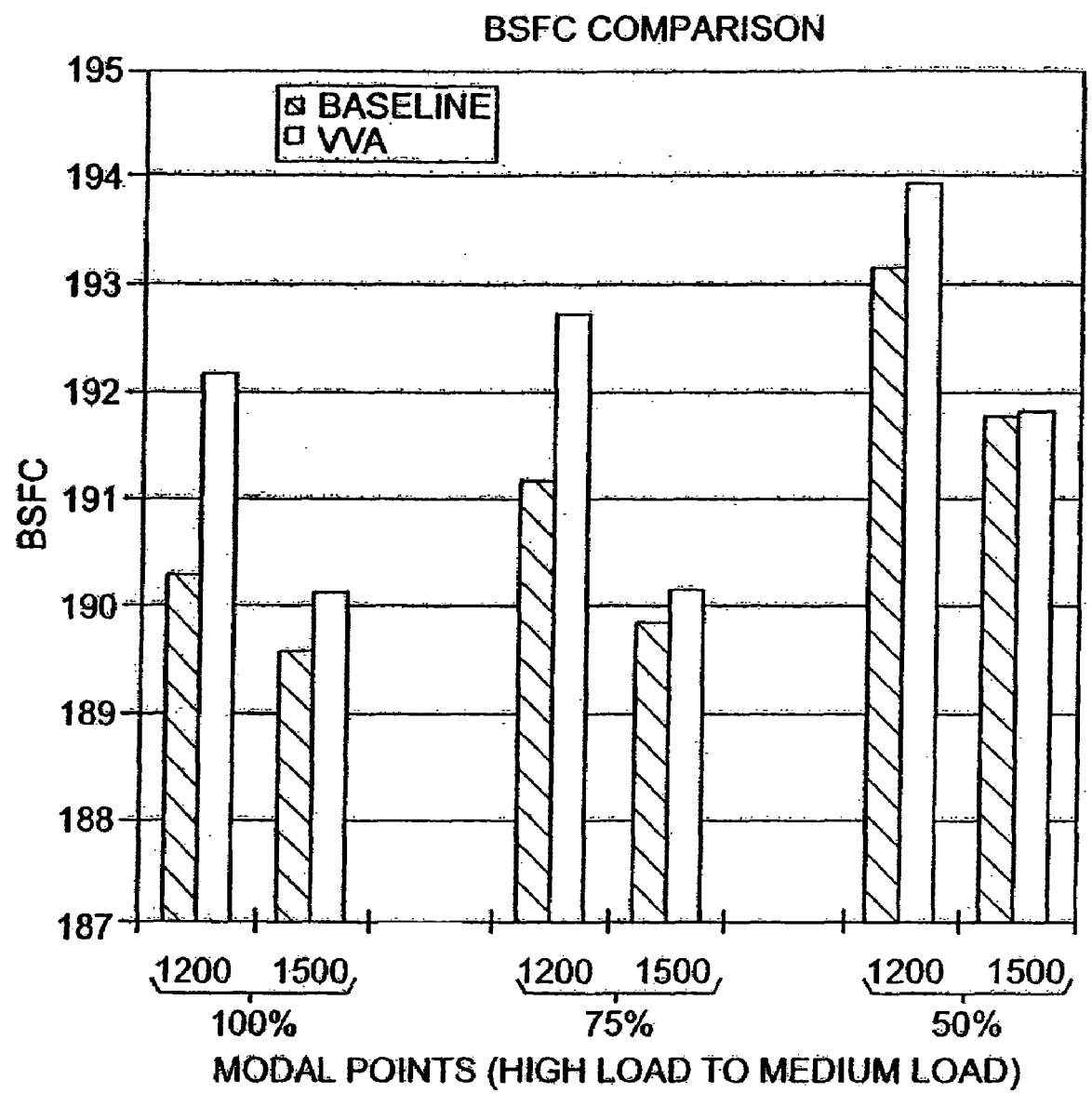
FIG. 5 is a graph comparing the brake specific fuel consumption produced by the embodiment of the present invention shown in FIG. 2 under different engine operating conditions with the BSFC produced by the baseline exhaust valve timing shown in FIG. 2.

With respect to FIG. 5, a comparison of the simulated brake specific fuel consumption (BSFC) provided by the first embodiment of the invention (denoted as "VVA") is made with the simulated BSFC provided by conventional exhaust valve timing (denoted as "Baseline"). The BSFC is simulated for three different engine operating conditions, ranging from high load (100%) to medium load (50%). BSFC for two different engine speeds (1200 and 1500 RPM) are shown for each load condition. FIG. 5 shows that at high to medium engine loads, the first embodiment of the present invention may not produce any appreciable fuel consumption increases (produced increases are on the order of about 0–1%).

Figure 6:
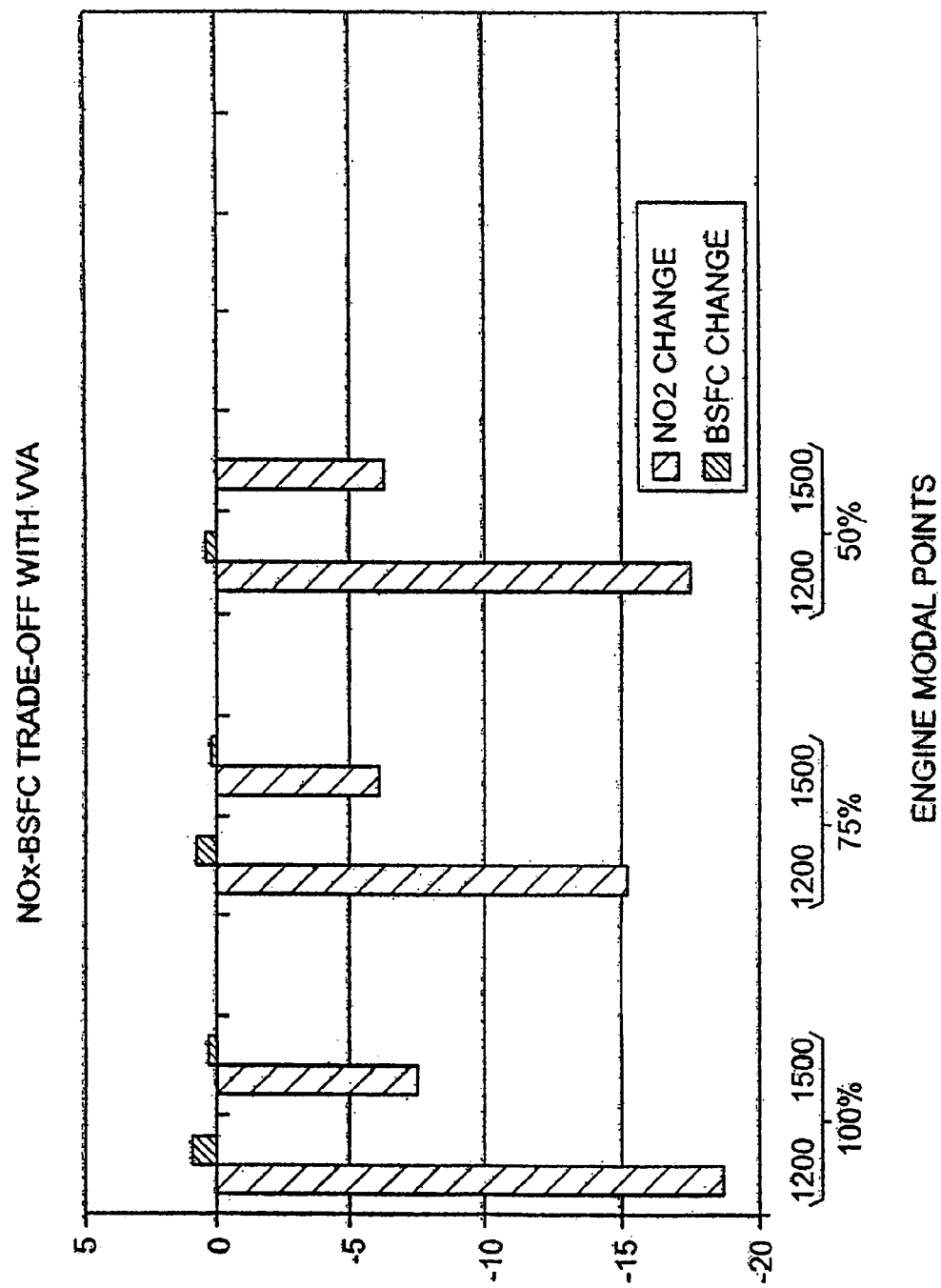
FIG. 6 is a graph of the NOx-BSFC trade-off that may be obtained using the embodiment of the present invention shown in FIG. 2 under different engine operating conditions.

The simulated exhaust temperatures shown in FIG. 4, the reduction of oxygen in the combustion mixture, and the simulated BSFC shown in FIG. 5 that result from the first embodiment of the present invention may be used to determine the comparative trade-off between NOx and BSFC provided by this embodiment of the invention. With reference to FIG. 6, the simulated NOx-BSFC trade-off is shown for three engine operating loads, and two different engine speeds per load. Of the six different combinations of load and speed, all may provide significant NOx reduction without impacting BSFC negatively in a significant manner. At the medium load condition (i.e., 50%), significant NOx reduction without any BSFC reduction is shown.

It will be apparent to those skilled in the art that variations and modifications of the present invention can be made without departing from the scope or spirit of the invention. For example, the amount of delay and advancement of the opening and closing, respectively, of the exhaust valve shown in FIG. 2 may be varied from engine to engine without departing from the intended scope of the invention. Furthermore, it is possible that embodiments of the present invention may be carried out without the use of a VVA system. In fact, the delay and advancement of the opening and closing of the exhaust valve could be produced by a fixed timed system instead of a variable system in an alternative embodiment without departing from the intended scope of the invention.

What is claimed is:

1. In an internal combustion engine having at least one cylinder containing a reciprocating piston and at least one exhaust valve, a method of selectively actuating the exhaust valve during positive power operation of the engine comprising the steps of:
   determining an engine operating condition during which reduction in NOx is desired; and
   selectively varying the closing time of the exhaust valve for the main exhaust event to occur between about 10 crank angle degrees before and about 10 crank angle degrees after top dead center position for the piston.

2. The method of claim 1 wherein the exhaust valve closing is selectively advanced to occur at about 10 crank angle degrees before top dead center position.

3. In an internal combustion engine having at least one cylinder containing a reciprocating piston and at least one exhaust valve, a method of selectively actuating the exhaust valve during positive power operation of the engine comprising the steps of:
   determining an engine operating condition during which reduction in NOx is desired;
   selectively varying the opening time of the exhaust valve for a main exhaust event to begin at about 150 or more crank angle degrees past top dead center position for the piston responsive to the determination of a desire to reduce NOx; and
   selectively varying the closing time of the exhaust valve for the main exhaust event to occur between about 10 crank angle degrees before and about 10 crank angle degrees after top dead center position for the piston.

4. The method of claim 3 wherein the closing time of the exhaust valve for the main exhaust event is selectively advanced to occur at about top dead center position for the piston.

5. The method of claim 3 wherein the exhaust valve opening is selectively delayed to begin at about 160 or more crank angle degrees past top dead center position.

6. The method of claim 5 wherein the exhaust valve closing is selectively advanced to occur at about 10 crank angle degrees before top dead center position.

7. The method of claim 3 wherein the exhaust valve opening is selectively delayed to begin at about 165 or more crank angle degrees past top dead center position.

8. The method of claim 7 wherein the exhaust valve closing is selectively advanced to occur at about 10 crank angle degrees before top dead center position.

9. In an internal combustion engine having at least one cylinder containing a reciprocating piston and at least one exhaust valve, a method of reducing the production of NOx, comprising the steps of:

opening the exhaust valve for a main exhaust event at about 150 or more crank angle degrees past top dead center position for the piston; and closing the exhaust valve for the main exhaust event between about 10 crank angle degrees before and about 10 crank angle degrees after top dead center position for the piston.

10. The method of claim 9 wherein the closing time of the exhaust valve for the main exhaust event is selectively advanced to occur at about top dead center position for the piston.

11. The method of claim 9 wherein the exhaust valve opening begins at about 160 or more crank angle degrees past top dead center position.

12. The method of claim 11 wherein the exhaust valve closing occurs at about 10 crank angle degrees before top dead center position.

13. The method of claim 9 wherein the exhaust valve opening begins at about 165 or more crank angle degrees past top dead center position.

14. The method of claim 13 wherein the exhaust valve closing occurs at about 10 crank angle degrees before top dead center position.

* * * * *